United States Patent
Carsten

[15] 3,703,913
[45] Nov. 28, 1972

[54] AUTOMATIC RATE OF FLOW CONTROL VALVE

[72] Inventor: Paul W. Carsten, Malibu, Calif.
[73] Assignee: CVC Company, Santa Ana, Calif.
[22] Filed: Aug. 2, 1971
[21] Appl. No.: 168,316

[52] U.S. Cl. ............... 137/599, 137/517, 137/512.1, 138/43, 251/DIG. 3, 137/525
[51] Int. Cl. ............................................. F16k 15/14
[58] Field of Search ..... 137/512.1, 517, 599; 138/40, 138/43, 45, 46; 251/DIG. 3

[56] References Cited

UNITED STATES PATENTS

| 1,079,985 | 12/1913 | Kaminsky | 251/DIG. 3 |
| 1,701,805 | 2/1929 | Dunn et al. | 138/40 |
| 1,395,932 | 11/1921 | Staude | 251/DIG. 3 |

Primary Examiner—Robert G. Nilson
Attorney—Harris, Kiech, Russell & Kern

[57] ABSTRACT

An automatic rate of flow control valve comprising an orifice plate and a conically shaped helical spring including a series of coils of decreasing diameter from a base coil on an upstream face of the plate, the inner diameter of each coil being equal to or greater than the outer diameter of the coils upstream thereof.

10 Claims, 12 Drawing Figures

AUTOMATIC RATE OF FLOW CONTROL VALVE

The present invention relates to apparatus for regulating fluid flow rate and more particularly to an automatic rate of flow control valve.

To achieve maximum efficiency of operation in sprinkler, air conditioning, and other fluid systems, it is desirable that fluid flow at substantially constant rates despite changes in pressure at various points in the systems. Numerous flow-control valves have been designed for such systems in an attempt to economically achieve the desired uniformity of flow rate. Unfortunately, prior flow-control valves possess serious limitations and disadvantages such as a high pressure differential threshold of operation, limited temperature and pressure differential ranges of uniform operation, noisy operation, slow response times, clogging, high pressure loss, and high cost of manufacture and servicing.

For example, some flow-control valves include rubber plugs or washers drawn or forced into orifices to regulate flow rate. Such valves deteriorate rapidly, change operating characteristics with age and temperature, develop high pressure losses, and commonly are noisy in operation.

Other flow-control valves comprise a spring-loaded hollow piston riding in a sleeve to expose orifices of different sizes to in line fluid flow with changes in the pressure differential thereacross. Such valves are subject to clogging and are costly to manufacture to the close tolerances required for maximum accuracy, particularly at low-flow rates.

Still other flow-control valves include a leaf spring disc for closing against a flat plate. Such valves are inaccurate and provide uniform flow over very limited ranges of pressure differential.

In view of the foregoing, it is an object of the present invention to provide a quiet and rapid acting flow-control valve of simple design which is temperature independent and inexpensive to manufacture, assemble, and service.

Another object of the present invention is to provide a flow-control valve of the foregoing character which will provide uniform flow over a wide range of pressure differentials.

A further object of the present invention is to provide a flow-control valve of the foregoing character which is self-cleaning.

Still another object of the present invention is to provide a flow-control valve of the foregoing character including an orifice member for mounting in a fluid line and including a substantially flat upstream face having a plurality of orifices therethrough, in combination with a conically shaped helical spring including a series of coils of decreasing diameter from a base coil on the upstream face.

A still further object of the present invention is to provide a flow-control valve of the foregoing character wherein the inner diameter of each coil is equal to or greater than the outer diameter of the coils upstream thereof.

Other objects and advantages of the present invention may be more clearly understood by reference to the following detailed description when considered with the drawings which, by way of example only, illustrate three flow-control valves embodying the features of the present invention.

Figure 1:
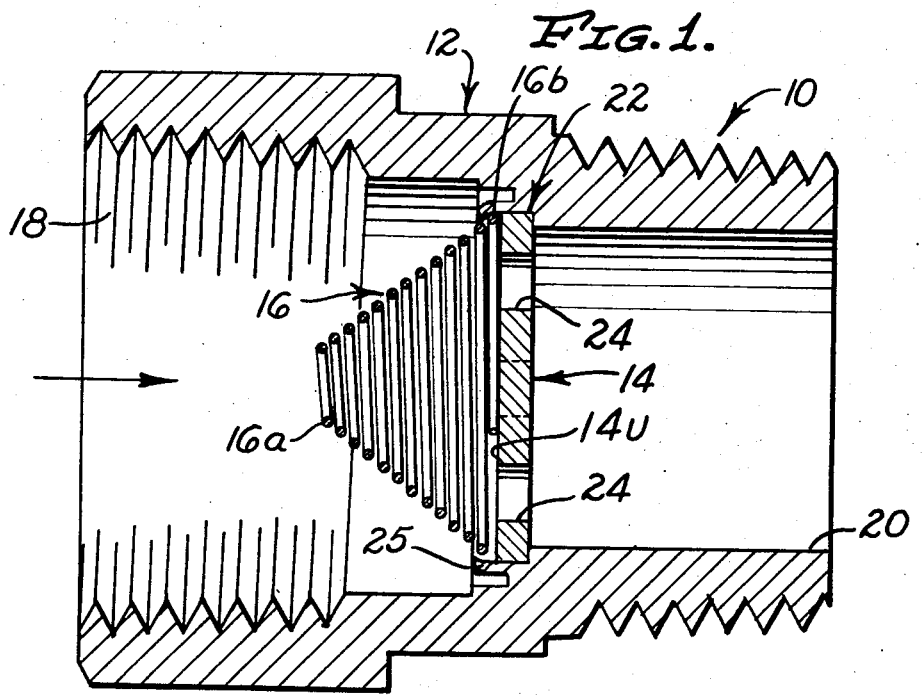
FIG. 1 is a cross sectional view of one form of flow-control valve embodying the features of the present invention and including an orifice plate mounted in and across a housing with a conically shaped helical spring on the upstream face thereof.

A basic form of the present invention is illustrated in FIG. 1 and represented by the numeral 10. Generally speaking, the flow-control valve 10 maintains constant fluid flow therethrough by decreasing the size of its valve opening as the pressure differential thereacross increases and by increasing the size of the valve opening as the pressure differential drops. To accomplish this and to meet the foregoing objects of the invention, the valve 10 comprises a housing 12, an orifice member 14, and an orifice regulating spring 16.

The housing 12 includes an inlet port 18 and an outlet port 20 for connection in series with a fluid line. In this regard, for the embodiment illustrated in FIG. 1, the interior of the inlet port 18 is threaded while the exterior of the housing surrounding the outlet port 20 is threaded for connection in a fluid line. In addition, the housing 12 contains internal means 22 for mounting the orifice member 14 between the inlet and outlet ports 18 and 20 such that fluid flows from upstream to downstream through orifices in the orifice member.

Figure 6:
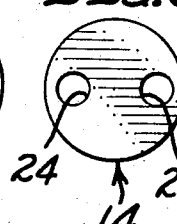
FIGS. 6 and 7 are end views of two forms of orifice plate utilized in the flow-control valve of the present invention.
Figure 7:
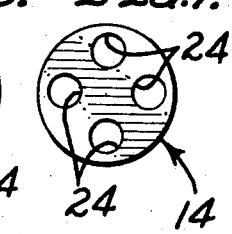

In the embodiment of FIG. 1, the orifice member 14 comprises a plate and the internal means 22 comprises an annular seat formed by a step in the inner surface of the housing 12 for tightly receiving the orifice plate to lie transverse to the direction of flow through the housing. The orifice plate 14 has a plurality of equally spaced orifices 24 therethrough. As depicted in FIGS. 6 and 7, the orifices preferably lie on a common radius near the periphery of the orifice plate.

Figure 2:
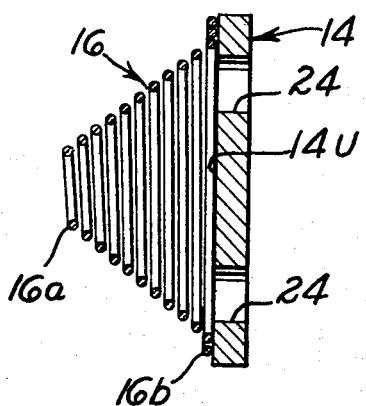
FIGS. 2 through 4 are sectional side views of the orifice plate and spring illustrated in FIG. 1 with the spring depicted in different states of axial collapse to regulate the rate of flow of fluid through orifices in the plate.
Figure 3:
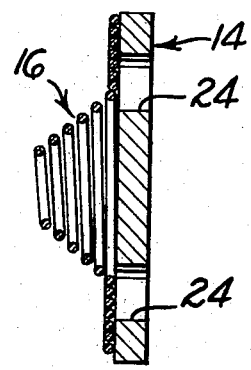
Figure 4:
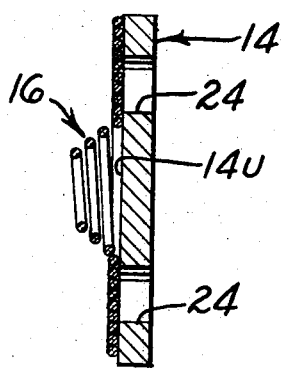

To maintain uniform flow through the valve 10, the orifices 24 are closed and opened with increases and decreases in the pressure differential between the inlet and outlet ports 18 and 20. In the present invention, such control is provided by closure of the spring 16 against a flat upstream face 14u of the orifice plate 14 with changes in the pressure differential. In this regard, it bears noting that the spring 16 is of a special configuration and design comprising a conically shaped helical spring. The spring consists of a series of coils of decreasing diameter from a base coil 16b of relatively large diameter seated by an inwardly bent collar 25 on the upstream face 14u around the orifices 24 to an apex coil 16a of relatively small diameter upstream of the orifice plate. Further, the inner diameter of each of at least the radially outermost and preferably all of the coils comprising the spring 16 is equal to or greater than the outer diameter of the coils upstream thereof. This insures that as the upstream to downstream pressure differential increases, the coils, starting with the coil 16b, axially and in series close flat against the upstream face 14u to progressively restrict the orifices 24. Such operation is most clearly depicted in FIGS. 2, 3, and 4.

As the coils close axially against the upstream face 14u, they unwind slightly. This causes the inside of each coil on the upstream face 14u to press tightly against the outside of the immediately adjacent coil and further restrict fluid flow through the orifices 24.

As the upstream to downstream pressure differential drops, the coils of the spring 16 move axially away from the upstream face 14u in an inverse manner; that is, from the apex coil 16a outward to open the orifices. In this manner, the coils axially and in series close against and open from the upstream face 14u with changes in pressure differential across the orifice plate 14 to maintain a uniform flow rate therethrough and in the fluid line associated with the valve 10.

The importance of the above-referred to dimensional limitation on the coils of the spring 16 may be more fully appreciated by considering the situation which would occur if the spring was constructed such that the inner diameter of its coils was less than the outer diameter of the coils upstream thereof. In such a situation, as the coils move toward the orifice plate 14, they would bind on top of each other to form a hollow cone leaving intact the opening defined by the apex coil 16a. There would be no closure of the orifices 24 and little or no flow regulation.

Figure 8:
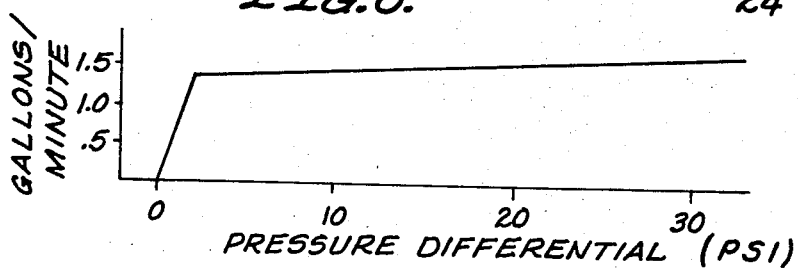
FIG. 8 is a graph depicting the rate of flow of fluid through the flow-control valve of the present invention with changes in pressure differential thereacross.

Contrast such a situation with the present invention where there is no undesired binding of the coils of the spring 16 as they move axially toward the orifice plate 14. In the latter case, the result is a valve operation as depicted by the graph of FIG. 8. As indicated, the valve of the present invention possesses a low pressure differential threshold of operation. Further, as the pressure differential increases, the rate of flow through the valve rapidly ascends to a predetermined or nominal value and remains substantially constant while the pressure differential increases in values upward of 30 psi.

Thus, the flow-control valve of the present invention is quick acting, simple in design, manufacture, and assembly and provides a uniform flow rate over a broad pressure differential range. Further, since the spring 16 is formed of metal, the operation of the valve is not temperature sensitive. Moreover, because of the constant movement of the spring 16, a self-cleaning action is effected to prevent dirt and other debris from clogging or otherwise interferring with the efficient and quiet operation of the valve.

Figure 5:
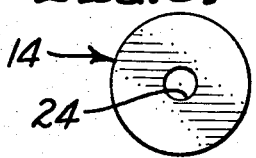
FIG. 5 is an end view of an orifice plate which may be utilized without a spring to provide a fixed orifice bypass in a fluid line.

In the present invention, the nominal flow rate of the valve may be regulated by the number and arrangement of orifices 24 in the orifice plate 14. Various orifice configurations are contemplated by the present invention, three of which are depicted in FIGS. 5, 6, and 7. In FIGS. 6 and 7, the orifices are of an even number equally and radially spaced from each other. In FIG. 5, the orifice plate 14 includes a single orifice 24. Such an orifice plate is designed for use without a spring 16 to function simply as a by-pass in a fluid line, as when a plurality of orifice plates and springs are included in combination with a valve body to insure a uniform and highly accurate flow rate therethrough. Such flow-control valve configurations are illustrated in FIGS. 9 through 12.

Figure 9:
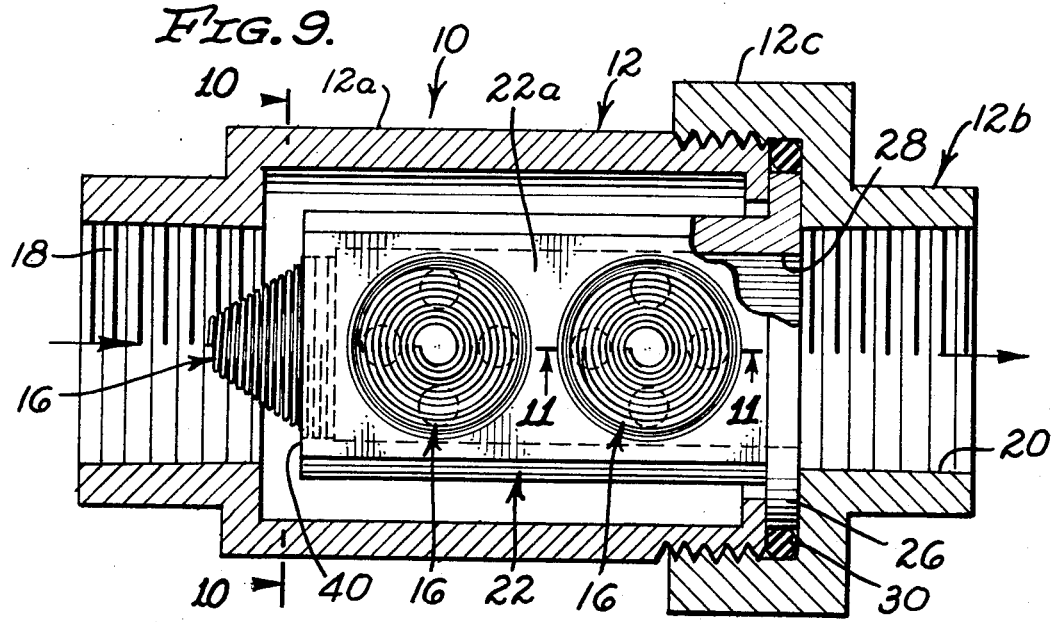
FIG. 9 is a sectional side view of a second form of flow-control valve including the features of the present invention.

The flow-control valve 10 represented in FIG. 9 is an in-line valve including a plurality of orifice plates 14 and springs 16 mounted in the housing 12. In this regard, the housing 12 comprises sections 12a and 12b. Section 12a is generally tubular and includes the internally threaded inlet port 18. The section 12b is also tubular and includes the internally threaded outlet port 20 and an internally threaded collar 12c. The collar 12c mates with an externally threaded end of the section 12a and secures the internal means 22 within the housing 12 for mounting the plurality of orifice plates 14 and springs 16.

Figure 10:
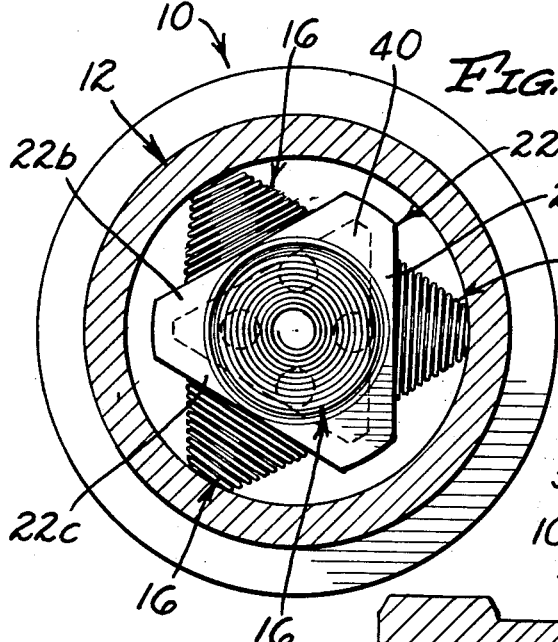
FIG. 10 is a cross sectional view taken along the line 10—10 in FIG. 9.

In this regard, in the embodiments of FIGS. 9-12, the internal means 22 comprises a hollow member having a triangular cross section and an annular flange 26 extending radially around an open downstream end 28. In the valve of FIGS. 9 and 10, the flange 26 fits between the end of the section 12a and a vertical wall in the section 12b with its outer edge bearing against an O-ring 30. Thus secured, the longitudinal axis of the hollow member 22 is substantially coaxial with the longitudinal axis of the housing 12.

Figure 11:
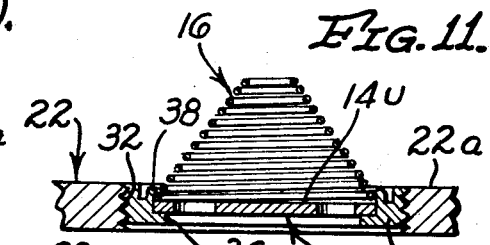
FIG. 11 is a fragmentary sectional view taken along the line 11—11 in FIG. 9.

As depicted in FIG. 10, the hollow member 22 has three substantially flat sides 22a, 22b, and 22c and upstream end 22d including a plurality of internally threaded ports 32, one in the end 22d and a pair in each of the sides 22a, b, and c. Preferably, the ports 32 are of equal size and of like spacing in each of the sides 22a-c. As shown in FIG. 11, each port 32 is adapted to receive an externally threaded annular insert 34 carrying an orifice plate 14 and spring 16. In this regard, the insert 34 includes an annular flange 36 acting as a seat for the marginal edge and downstream face of the orifice plate 14, and an annular upstream annular collar 38 bent slightly to grip the base coil 16a and hold the spring 16 securely on the upstream face 14u.

In operation, fluid flows from upstream through the inlet port 18, around the hollow member 22, through the orifices 24 in the various orifice plates 14 and out of the valve through the open end 28 and outlet port 20. With changes in the pressure differential between the inlet and outlet ports, each of the orifice plate and spring combinations function in the manner previously described with the coils thereof axially and in series closing against and opening from upstream faces 14u of the orifice plates 14 to maintain a uniform flow rate through the valve.

As previously indicated, the orifice plates in the valve of FIGS. 9 and 10 may include different arrays and numbers of orifices. For example, various of the ports may provide means for seating orifice plates of the type shown in FIG. 7, while others may include orifice plates of the type shown in FIG. 6. Where a fluid by-pass is desired, the orifice plate shown in FIG. 5 may be included in one of the ports 32. No spring 16 need be included over such an orifice plate.

Figure 12:
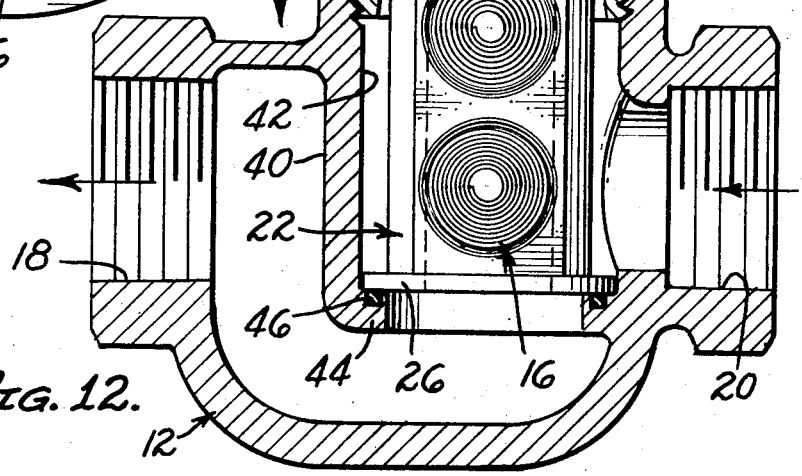
FIG. 12 is a sectional side view of a third form of flow-control valve embodying the features of the present invention.

Another embodiment of the flow-control valve of the present invention is illustrated in FIG. 12. As represented, the flow-control valve of FIG. 12 includes the hollow member 22 shown and described in connection with FIGS. 9 and 10. Therefore, a detailed description of that portion of the valve assembly will not be repeated.

In the embodiment of FIG. 12, the housing 12 comprises a globe-type body including a vertical semicircular partition 40 extending from a top of the housing adjacent an access hole 42. The hole 42 is adapted to receive the hollow member 22 with the orifice plates 14 and springs 16 mounted thereon. In this regard, an annular flange 44 extends from the bottom of the partition 40 and an internal wall of the housing 12 with an O-ring 46 on a top thereof to act as an annular seat for the flange 26 vertically supporting the hollow member 22 in the housing.

An internally threaded annular flange 48 extends upwardly from a top of the housing 12 around the access hole 42 to receive an externally threaded cap 50 for closing the access hole and holding the hollow member 22 down on the seat 44 to compress the O-ring 46. In this regard, the cap includes an internal shoulder 52 for engaging a top of hollow member 22 adjacent junctions of the sides 22a–c.

As represented, the cap 50 includes means for manually adjusting the precompression of the springs 16 seated on the top of the hollow member 22. The adjustment means comprises an externally threaded shaft 54 passing through an internally threaded hole 56 in the top of the cap and carrying a plug 58 for pressing on the top of the spring 16. The shaft 54 has an enlarged head 60 at its upper end which is gripped during hand-turning of the shaft to raise or lower the plug 58 within the cap to control the degree of precompression of the spring 16.

In operation, the hollow member 22 and associated orifice plates 14 and spring 16 function as in the embodiment of FIGS. 9 and 10 with the exception of the top spring 16. Due to the precompression of the top spring 16 the pressure differential thereacross must reach a higher value before the spring will begin to axially close against its associated orifice plate. Thus, while the other springs are moving to regulate fluid flow, the top spring remains stationary to expose orifices of a size determined by the amount of compression of the coils on the orifices 24 in the associated plate 14. This provides additional means for regulating the resulting flow rate through the valve at different pressure differentials.

While particular forms of flow-control valves have been described in detail herein, changes and modifications may be made without departing from the spirit of the invention. It is therefore intended that the present invention be limited in scope only by the terms of the following claims.

I claim:

1. An automatic rate of flow-control valve comprising:

an orifice member for mounting in a fluid line and including a substantially flat upstream face having a plurality of orifices therethrough; and a conically shaped helical spring including a series of coils of decreasing diameter from a base coil of relatively large diameter on said upstream face around said orifices to an apex coil of relatively small diameter upstream of said orifice member, the inner diameter of at least the radially outermost coils being equal to or greater than the outer diameter of the coils upstream thereof, whereby said coils axially and in series close against and open from said upstream face with changes in pressure differential across said orifice member to maintain a uniform flow rate in said line.

2. The valve of claim 1 further comprising a housing including a fluid inlet and a fluid outlet for connection in said line and internal means for mounting said orifice member between said inlet and outlet such that fluid flows from upstream to downstream through said orifices.

3. The valve of claim 2 further comprising adjustable means extending into said housing for axially precompressing said spring.

4. The valve of claim 2 wherein:
said housing is generally tubular;
said orifice member comprises a flat plate; and
said internal means comprises a seat on an inner surface of said housing for mounting said plate transverse to the direction of fluid flow through said housing.

5. The valve of claim 2 wherein:
said internal means comprises a hollow member seated in said housing and including an open downstream facing end and a plurality of ports each having a seat for receiving an orifice member; and
said valve includes a plurality of said orifice members mounted on said seats and a plurality of said conically shaped helical springs having base coils on upstream faces of said orifice members.

6. The valve of claim 5 further including adjustable means extending into said housing for axially precompressing at least one of said springs.

7. The valve of claim 5 wherein said hollow member is of generally triangular cross section including three substantially flat sides having said ports therein.

8. The valve of claim 7 wherein said hollow member is substantially co-axial with said housing in the direction of fluid flow and includes an upstream facing end having a port therein with one of said orifice members mounted therein with one of said conically shaped helical springs secured thereon with its base coil on an upstream face thereof.

9. The valve of claim 5 wherein:
said housing is a globe-type body including a partition extending from a top of said housing transverse to the direction of flow through said inlet, an access hole in said top adjacent said partition and a seat on said partition and inner surface of said housing for vertically supporting said hollow member under said access hole whereby said hollow member, orifice members, and springs may be inserted and removed from said housing; and
said valve includes a cap for sealing said access hole.

10. The valve of claim 9 wherein:
said hollow member includes a port in an upper end facing said access hole with one of said orifice members mounted therein with one of said springs secured thereon with its base coil on an upper face thereof; and said valve further includes adjustable means extending through said cap to axially precompress said one spring under said access hole.

* * * * *